Nov. 9, 1954  J. A. CAMPBELL  2,694,171
ELECTRIC MOTOR SYSTEM FOR LIQUID LEVEL CONTROL
Filed Jan. 26, 1953  2 Sheets-Sheet 1
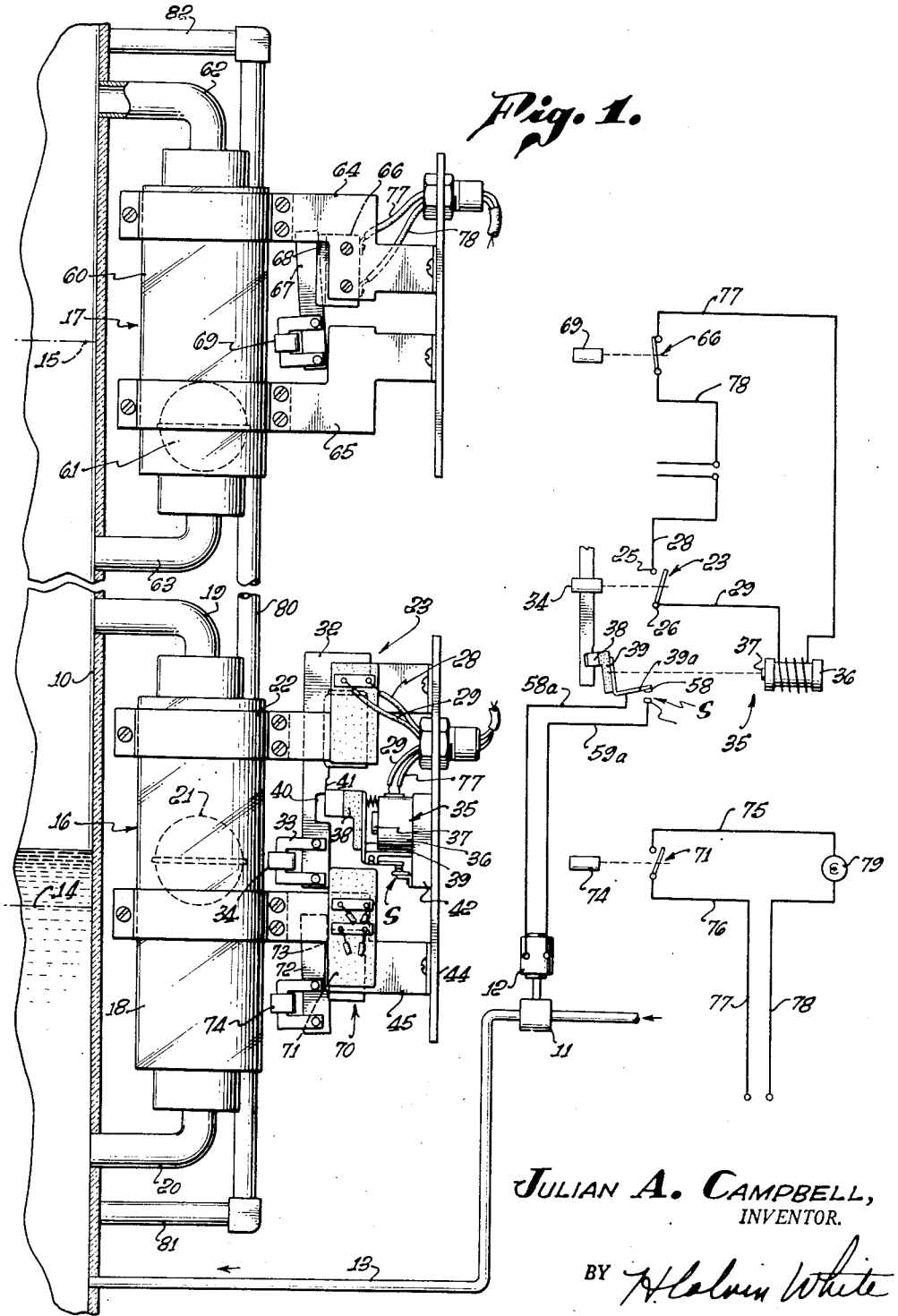
JULIAN A. CAMPBELL,
INVENTOR.
BY H. Calvin White
ATTORNEY.

Nov. 9, 1954  J. A. CAMPBELL  2,694,171
ELECTRIC MOTOR SYSTEM FOR LIQUID LEVEL CONTROL
Filed Jan. 26, 1953  2 Sheets-Sheet 2
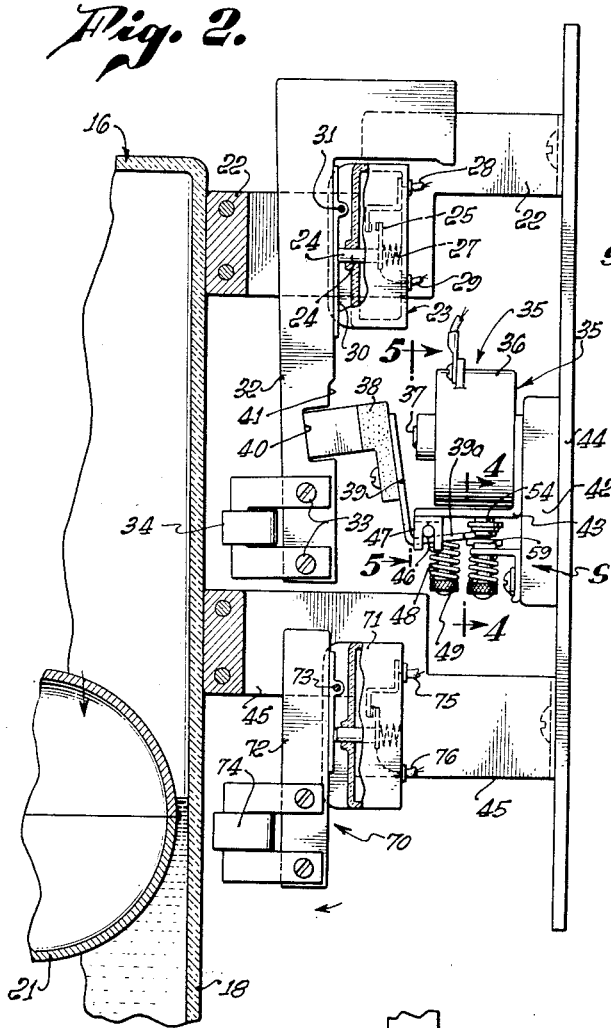
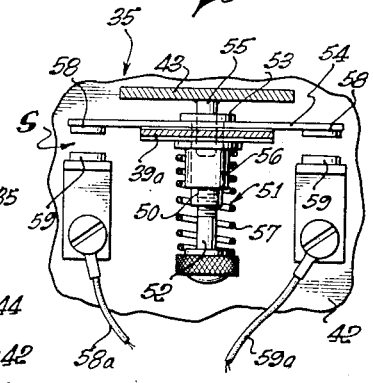
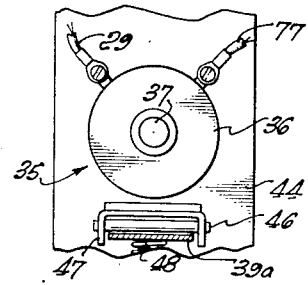
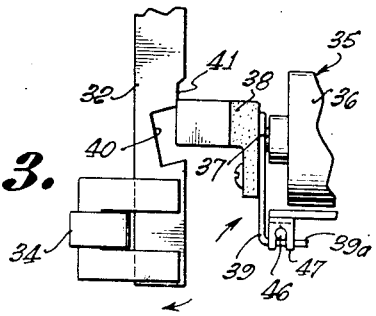
INVENTOR.
JULIAN A. CAMPBELL
BY H. Alvin White
ATTORNEY.

United States Patent Office 2,694,171
Patented Nov. 9, 1954

2,694,171

ELECTRIC MOTOR SYSTEM FOR LIQUID LEVEL CONTROL

Julian A. Campbell, Long Beach, Calif.

Application January 26, 1953, Serial No. 333,320

11 Claims. (Cl. 318—482)

This invention relates generally to liquid level control equipment, and is directed particularly to improvements in apparatus adaptable to outstanding advantage in the control of liquid feed into a tank or chamber within which the liquid level may change within a wide range.

As in the case of other level control systems, the present apparatus operates generally to govern liquid delivery to the chamber, as through control of a supply pump, by starting and stopping the delivery, respectively as the level in the chamber reaches predetermined lower and upper limits. However, the present invention departs from all prior controls of which I am aware, in the particular manner and assured effectiveness of governing the feed delivery or pump operation throughout the full range of the liquid level rise to be maintained.

I preferably employ in the control system a plurality of magnetically actuated liquid level responsive units or devices of the general type disclosed in Patent No. 2,590,680, issued March 25, 1952, to me on Apparatus for Liquid Level Control. Briefly, that type of device may comprise a vertically extending non-magnetic tube receiving the liquid at the chamber level and containing a magnetic float, or float carrying a magnetic metal, to which a magnet movably mounted at the outside of the tube is responsive to open or close an electrical switch as the liquid level reaches or drops below a predetermined level. In accordance with the invention I employ a pair of such devices spaced vertically at locations corresponding to the liquid level range to be maintained. As will appear, if desired a third and lowermost float responsive switch may be incorporated in the system as an alarm expediency where for any reason the chamber liquid may fall to an objectionably or dangerously low level.

One of my major objects is to employ the combination of such upper and lower liquid level responsive devices in a manner such that the lower device, connected into the pump motor circuit, is actuated into a locked condition to start the motor as the chamber liquid falls to a lower level and to continue the motor operation until the liquid arrives at the maximum level to be maintained, the upper switch device then serving the function of causing discontinuance of the motor operation, specifically by releasing the locked condition of the lower switch device and causing it to deenergize the pump motor when the chamber liquid reaches its intended upper level. The operative relation between the upper and lower controls is such that upon return of the liquid to its lower level, the lower control becomes effective independently to start the feed pump in operation.

The particular manner in which these functions are performed by the control system, and the details of an illustrative embodiment of the invention, will be more fully understood from the following detailed description of the accompanying drawings, in which:

Fig. 1 is a view showing in side elevation the liquid level control system, and including a wiring diagram of the feed liquid pump motor switch controls;

Fig. 2 is an enlarged view, sectional in parts, of the lower control devices appearing at the left in Fig. 1;

Fig. 3 is a fragmentary enlargement showing the magnet actuated dogging element associated with the lower control;

Fig. 4 is an enlarged cross-section on line 4—4 of Fig. 2; and

Fig. 5 is a section taken on line 5—5 of Fig. 2.

Referring first to the general showing of Fig. 1, the control system is here illustrated as applied to a tank or other chamber 10 receiving liquid delivered by pump 11 driven by motor 12, through the inlet line 13. As previously indicated, the present control system is particularly applicable to the control of liquid level in the tank 10, where it may be desirable for the liquid to rise and fall within a wide vertical range, corresponding for example to the elevations at 14 and 15 which may be many feet apart. The control system may be generally regarded as comprising a lower control and switch device generally indicated at 16 serving to start the feed pump 11 into operation when the tank liquid drops to the lower elevation at 14, and upon further lowering of the liquid to create an alarm, and an upper control switch device generally indicated at 17 which operates to cause deenergization of the feed pump through the lower control 16 when the liquid rises to a level at the upper elevation 15. Specifically, as will appear, the upper control 17 serves the particular function of releasing the holding means incorporated in the lower control 16, which assures continued energization of the feed pump until the tank liquid is brought up to the intended upper level.

Referring to the lower control device 16, the latter comprises a vertically positioned tube or cylinder 18 of plastic or other non-metallic material, connected top and bottom through lines 19 and 20 with the tank 10 so that the liquid level at the elevation 14 will extend in the cylinder 18 at a level corresponding to its level in the tank. The cylinder contains a ball float 21 made of magnetic metal, or at least carrying or comprising in part magnetic metal, so as to be attractable to the later described switch-actuating magnet. Desirably the cylinder 18 may be made of transparent material so that the position of the float may be observed.

Attached to the cylinder 18 is a clamp bracket 22 which supports a micro switch 23 of suitable type, shown for purposes of illustration as comprising a pin 24 carrying a contact or pole 25 engageable in make and break relation with a second stationary contact 26, circuit opening movement of the pin and contact 25 being resisted by coil spring 27. Leads 28 and 29 connect respectively with the contacts 26 and 25. The switch also includes an arm 30 pivotally mounted at 31 for engaging and actuating the pin 24.

A relatively large depending arm 32 is attached to the switch arm 30 so as to swing therewith about the pivot 31. At its lower end the arm 31 carries a holder 33 which retains in direct opposition to the wall of the cylinder 13 a magnet 34. At this point it may be observed that upon arrival of the float 21 to the Fig. 1 position more or less opposite the magnet 34, the latter is attracted by the float to swing arm 32 inwardly to the position thereshown at which the switch contacts 25 and 26 are closed. Unless restrained by the later described dogging means, the switch arm is free to swing outwardly (by reason of its offset center of gravity in relation to the pivot 31) to the Fig. 2 position as the float 21 moves above or below the elevation of the magnet 34.

Releasable retention of arm 32 in its Fig. 1 switch closing position, is effected by holding means generally indicated at 35 which, as will later appear, is governed as to its releasing action, by the upper control device 17.

Referring particularly to Figs. 2 and 3, the assembly 35 comprises a general combination of an electromagnet 36 having a pole 37 and a dogging element 38 carried by arm 39 which, upon energization of the electromagnet, is attracted to the pole 37 to retract the element 38 from notch 40 in the arm 32, into engagement with shoulder 41, see Fig. 3. The assembly 35 including support 42 and bracket 43, is carried by member 44 attached to the terminals of bracket 22 and a lower similar clamp bracket 45.

The dogging element arm 39 is carried by a pin or shaft 46 received within the slotted depending ends of a guide 47, see Fig. 5, attached to bracket 43. Outward swinging movement of arm 39 from the Fig. 2 position is resisted by coil spring 48 carried by stud 49 extending through an opening in the arm extension 39a, the spring bearing against the underside of the extension. The slotted end of the arm extension 39a receives the upper section 50 of a two-part screw 51, see Fig. 4, including also a lower adjustable section 52 which threads into part 50. The latter has an upper flanged end 53 bearing against a transverse contact arm 54 carried by the arm extension 39a. Part 50 has a bore receiving a guide pin 55 depending from the bracket 43. The screw section 50 carries a slideable sleeve 56 urged against the arm 39a by coil spring 57. Contacts 58 on the arm 54 are engageable with conductor terminals 59 to constitute a switch S which opens and closes in accordance with the movements of the dogging element 38. By virtue of the described mounting of pin 46 for vertical displacement, and the yieldable support given the arm extension 39a by the spring urged sleeve 56, arm 39 and the dogging element 38 are given the capacity by both swinging and such vertical movement as may be required to assure their movements in the Figs. 2 and 3 relations with arm 32.

Thus the switch S operates in the nature of a relay, by and in accordance with the movements of the arm 39 to control starting and stopping of the motor 11, the switch leads 58a and 59a being connected to the motor as shown in the wiring diagram of Fig. 1. As will later appear, the function of the series-connected micro switch 23 is to energize the electromagnetic coil 36 and thus effect closing of the switch S when the float 21 reaches its magnet 34 actuating position corresponding to the lower water level at which the pump is to be started.

The upper control device 17 comprises a vertically positioned cylinder 60 containing a magnetic metal float 61 and connected top and bottom through lines 62 and 63, all in similar relation to the corresponding parts previously described with relation to the lower control 16. The cylinder 60 carries spaced brackets 64 and 65, the upper of which carries the micro switch 66 and an arm 67 pivotally supported at 68, all similar to the previously described micro switch 23 and mounting of arm 32. Arm 67 carries a magnet 69 shown in Fig. 1 to be swung away from the cylinder 60 in a position at which the micro switch 66 is closed. As the float 61 rises to a level opposite the magnet 69, the latter is attracted toward the float to open the switch 66.

Referring again to Fig. 1, the control system may also include an auxiliary switch device generally indicated at 70 and which is responsive to abnormally low liquid level in the tank 10 at which the float 21 has dropped to the Fig. 2 position. The device at 70 comprises the micro switch 71, arm 72 pivotally mounted at 73 and magnet 74 carried by the arm for movement toward and away from the float 21 to close and open the micro switch. The latter is connected to leads 75 and 76, and the uppermost micro switch 66 is connected to power leads 77 and 78 forming a circuit containing also an appropriate signaling device, typically the lamp 79.

The liquid level in the tank 10 may at all times be observed independently of the float chambers 18 and 60, by means of a tubular gauge glass 80 receiving the tank liquid through connections 81 and 82.

In considering the operation of the system, assume first that the lower float 21 has risen to the Fig. 1 level opposite magnet 34, causing arm 32 to swing inwardly to the position at which micro switch 23 is closed and the arm is held by the dogging element 38 in switch closing position. Referring to the wiring diagram of Fig. 1, the upper micro switch 66 normally, and in the condition of the control 17 illustrated in Fig. 1, is closed so that upon closure of the switch 23, coil 36 is energized to retract the dogging element 38 from the arm recess 40 to block the arm against outward swinging movement. The resultant swinging of arm 39 and its integral extension 39a, closes the switch S and starts the pump and motor 11, 12 in operation. As will be understood, the primary function of switch 23, connected as it is in series with switch 66 and the coil 36, is to energize the latter and effect the closing of switch S upon arrival of the float 21 at its Fig. 1 position.

As the tank liquid approaches the uppermost level to be maintained, float 61 is elevated to a position opposite the magnet 69, whereupon micro switch 66 opens to de-energize the coil 36, freeing switch S to open to the Fig. 2 position wherein the element 38 is shown to have re-entered the notch 40, allowing arm 32 to swing outwardly to open the switch 23. The pump operation is thus discontinued, and remains so until the liquid level falls to the lower elevation at which float 21 drops to the Fig. 1 position and the described operation is then repeated.

In the event faulty operation of any of the control parts prevents starting of the motor with float 21 at the Fig. 1 position and withdrawal of liquid from the tank continues with resultant further lowering of the liquid to an objectionable or dangerous low level, the float 21 upon arrival at the Fig. 2 position, attracts the magnet 74, pulling arm 72 inwardly and closing the micro switch 70 to energize the signal or alinement 79.

I claim:

1. Wide range liquid level control apparatus comprising upper and lower tubes adapted to be positioned vertically at spaced elevations and to receive liquid from a body of liquid the level of which varies between those elevations, floats in said tubes comprising magnetic metal, upper and lower magnetically responsive switch devices at the outside of said tubes and each including an actuating magnet movable between an inner position toward the tube and an outer position away from the tube as the float therein moves opposite and below the magnet, means for releasably holding the lower magnet in its said inner position, and control means actuated by said upper switch for controlling the operation of said holding means.

2. Apparatus as defined in claim 1, in which said holding means comprises a dogging element engageable with the lower switch device to block outward movement of its magnet and movable into and out of such engagement.

3. Apparatus as defined in claim 1, in which said control means actuated by the upper switch means comprises electrically energized magnetic means operable to release said holding means.

4. Apparatus as defined in claim 1, comprising a pivoted arm carrying said lower magnet, and in which said holding means comprises a pivoted dogging element engageable against the arm and movable into and out of a recessed portion thereof.

5. Apparatus as defined in claim 1, comprising a pivoted arm carrying said lower magnet, said holding means comprising a pivoted dogging element engageable against the arm and movable into and out of a recessed portion, said central means comprises a magnet electrically connected to said upper switch means and operable to retract the dogging element out of the recessed portion of the lower arm into blocking engagement therewith.

6. Apparatus as defined in claim 1, comprising a third alarm switch device below said lower switch device and actuated by and in accordance with the elevation of the lower float when it falls to a low water level position.

7. The combination comprising a liquid-containing chamber, upper and lower tubes positioned vertically at spaced elevations at the outside of the chamber and connected thereto to receive liquid from the chamber at levels which vary between those elevations, a pump for delivering liquid to the chamber, a motor for driving the pump, floats in said tubes comprising magnetic metal, upper and lower magnetically responsive switch devices at the outside of said tubes and each including an actuating magnet movable between an inner position toward the tube and an outer position away from the tube as the float therein moves opposite and below the magnet; means electrically connecting said lower switch device with said pump motor, holding means operable upon inward movement of the lower magnet to hold the lower magnet in its inner position and thereby maintain the pump motor in operation while the liquid level rises from said lower elevation to the upper elevation, and control means electrically connected with said upper switch device and operable thereby to release said holding means when the liquid level reaches said upper location.

8. Apparatus as defined in claim 7, in which said holding means comprises a dogging element engageable with the lower switch device to block outward movement of its magnet and movable into and out of such engagement.

9. Apparatus as defined in claim 7, comprising a pivoted arm carrying said lower magnet, and in which said holding means comprises a pivoted dogging element engageable against the arm and movable into and out of a recessed portion thereof.

10. Apparatus as defined in claim 7, comprising a pivoted arm carrying said lower magnet, said holding means comprising a pivoted dogging element engageable against the arm and movable into and out of a recessed portion, said control means comprises a magnet electrically connected to said upper switch means and operable to retract the dogging element out of the recessed portion of the lower arm into blocking engagement therewith.

11. Apparatus as defined in claim 7, comprising a third alarm switch device below said lower switch device and actuated by and in accordance with the elevation of the lower float when it falls to a low water level position.

References Cited in the file of this patent

UNITED STATES PATENTS

| Number | Name | Date |
|--------|------|------|
| 355,815 | Ghegan | Jan. 11, 1887 |
| 986,210 | Pearson | Mar. 7, 1911 |